United States Patent
Turpin et al.

(10) Patent No.: US 9,379,439 B2
(45) Date of Patent: Jun. 28, 2016

(54) ADAPTIVE INTERFERENCE SUPPRESSION VIA SUBBAND POWER MEASUREMENTS OF A PHASED-ARRAY ANTENNA

(71) Applicant: The Boeing Company, Seal Beach, CA (US)

(72) Inventors: Raenaurd D. Turpin, La Mirada, CA (US); Murat E. Veysoglu, Cypress, CA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 14/180,402

(22) Filed: Feb. 14, 2014

(65) Prior Publication Data

US 2015/0236413 A1    Aug. 20, 2015

(51) Int. Cl.
*H01Q 3/34*    (2006.01)
*H04W 16/28*    (2009.01)
(Continued)

(52) U.S. Cl.
CPC ............... *H01Q 3/34* (2013.01); *H04W 16/28* (2013.01); *G01S 7/36* (2013.01)

(58) Field of Classification Search
CPC ............. H01Q 3/26; H01Q 3/30; H01Q 3/34; H01Q 25/00; H01Q 25/007; H01Q 3/40; H01Q 3/2605; H01Q 3/2611; H01Q 3/2617; H04W 16/24; H04W 16/28; G01S 3/02; G01S 3/14; G01S 3/28; G01S 3/30; G01S 7/02; G01S 7/36; H04B 7/02; H04B 7/04; H04B 7/0404; H04B 7/06; H04B 7/08; H04B 7/0613; H04B 7/0615; H04B 7/0837; H04B 7/0842; H04B 7/0848; H04B 7/086; H04B 7/0891
See application file for complete search history.

(56) References Cited

U.S. PATENT DOCUMENTS

| 3,670,335 A | * | 6/1972 | Hirsch | H01Q 3/2617 342/157 |
| 3,725,929 A | * | 4/1973 | Spanos | H01Q 25/00 342/372 |

(Continued)

FOREIGN PATENT DOCUMENTS

WO    WO 02-07257 A1    1/2002

OTHER PUBLICATIONS

Joshi et al., "Optimization of Linear Antenna Array Using Genetic Algorithm for Reduction in Side Lobe Levels and to Improve Directivity," International Journal of Latest Trends in Engineering and Technology (IJLTET), vol. 2, Issue 3, May 2013, pp. 185-191.

(Continued)

*Primary Examiner* — Bernarr Gregory
(74) *Attorney, Agent, or Firm* — Womble Carlyle Sandridge & Rice LLP

(57) ABSTRACT

A phased-array antenna system includes an array of antenna feed elements that produces a radiation pattern to provide spot beams within which to receive a signal in a frequency band and carrying communication from a terminal at a known geographic location. A beamformer forms the spot beams; and a channelizer divides the frequency band into frequency subbands, and measures power levels of the signal over respective frequency subbands. And an antenna controller selects a frequency subband based on the measured power levels indicating that the signal includes an identifiable interference, and calculates a set of beam weights based on the measured power level over the selected frequency subband, and based on the known geographic location of the terminal. The beamformer, then, forms the spot beams based on the calculated set of beam weights to thereby suppress at least some of the identifiable interference from the signal.

16 Claims, 10 Drawing Sheets

(51) Int. Cl.
    H01Q 3/00      (2006.01)
    G01S 7/36      (2006.01)

(56) References Cited

U.S. PATENT DOCUMENTS

| | | | | |
|---|---|---|---|---|
| 3,766,559 A * | 10/1973 | Butcher, Jr. | ............ | H04B 7/0891 |
| | | | | 342/368 |
| 4,225,870 A * | 9/1980 | Marner | ................ | H01Q 3/2617 |
| | | | | 342/360 |
| 4,246,585 A * | 1/1981 | Mailloux | ............. | H01Q 3/2611 |
| | | | | 342/373 |
| 4,298,873 A * | 11/1981 | Roberts | ................ | H01Q 3/2617 |
| | | | | 342/375 |
| 4,408,205 A * | 10/1983 | Hockham | ................ | H01Q 3/40 |
| | | | | 342/157 |
| 4,431,995 A * | 2/1984 | Barton | ................ | H01Q 3/2605 |
| | | | | 342/373 |
| 4,872,016 A * | 10/1989 | Kress | ................... | H01Q 3/2617 |
| | | | | 342/372 |
| 5,218,359 A * | 6/1993 | Minamisono | ............. | G01S 3/30 |
| | | | | 342/378 |
| 5,343,211 A | 8/1994 | Kott | | |
| 5,592,178 A * | 1/1997 | Chang | ..................... | H01Q 3/26 |
| | | | | 342/154 |
| 5,694,416 A * | 12/1997 | Johnson | ................... | H04B 7/08 |
| | | | | 342/368 |
| 6,107,963 A * | 8/2000 | Ohmi | ................... | H01Q 3/2605 |
| | | | | 342/378 |
| 6,141,567 A * | 10/2000 | Youssefmir | .......... | H04B 7/0615 |
| | | | | 375/349 |
| 6,177,906 B1 * | 1/2001 | Petrus | ...................... | H01Q 3/26 |
| | | | | 342/373 |
| 6,275,188 B1 | 8/2001 | Chen | | |
| 6,633,265 B2 * | 10/2003 | Hirabe | ................. | H01Q 3/2611 |
| | | | | 342/372 |
| 6,799,014 B2 | 9/2004 | Rosen et al. | | |
| 6,946,992 B2 * | 9/2005 | McCleary | ............ | H01Q 25/007 |
| | | | | 342/368 |
| 7,006,042 B2 * | 2/2006 | Tong | .................... | H04B 7/0848 |
| | | | | 342/377 |
| 7,092,690 B2 * | 8/2006 | Zancewicz | .......... | H01Q 3/2605 |
| | | | | 342/368 |
| 7,248,897 B2 * | 7/2007 | Hsu | ........................ | H04B 7/086 |
| | | | | 342/377 |
| 8,115,679 B2 | 2/2012 | Falk | | |
| 8,217,826 B1 * | 7/2012 | Djang | ....................... | G01S 7/36 |
| | | | | 342/13 |
| 8,493,281 B2 | 7/2013 | Lam et al. | | |

OTHER PUBLICATIONS

Salas Natera et al., "New Antenna Array Architectures for Satellite Communications," Advances in Satellite Communications, Dr. Masoumeh Karimi (Ed.), InTech (2011), 29 pages.

"Genetic Algorithm," 2013, Wikipedia article—http://en.wikipedia.org/wiki/Genetic_algorithm [Dec. 2, 2013], 15 pages.

* cited by examiner

ADAPTIVE INTERFERENCE SUPPRESSION VIA SUBBAND POWER MEASUREMENTS OF A PHASED-ARRAY ANTENNA

TECHNOLOGICAL FIELD

The present disclosure relates generally to phased-array antenna systems and, in particular, to interference suppression in a phased-array antenna system.

BACKGROUND

Phased-array antenna systems are used in a variety of communication applications. A phased-array antenna system generally includes an array of antenna feed elements that emits and/or receives radio frequency signals by forming a beam that can be steered through different angles. Through controlling the manner in which the signals are emitted or received, the direction may be changed. The changing of the direction is also referred to as steering.

One example of a typical application of phased-array antenna systems is on communication satellites. These communication satellites are often used on wireless communication platforms for remote, hard to access, or mobile user terminals, e.g., mobile platforms, to provide service coverage over large geographic footprints, often including remote land-based or water-based regions. Generally, base stations (e.g., ground base stations) send information (e.g., data) to the user terminals through a bent pipe system using one or more satellites. More specifically, the base stations send information on a forward link to the satellite that receives, amplifies and re-transmits the information to an antenna of one or more fixed or mobile user terminals. The user terminals, in turn, can send data back to the base stations via the satellite. The base stations can provide the user terminals with links to the Internet, public switched telephone networks, and/or other public or private networks, servers and services.

Modern satellites and other cellular communication systems often employ a number of spot beams providing a beam laydown that forms coverage over a geographic region that may be divided into a plurality of cells. In a communication system using spot beams, the same frequency may be used at the same time in two or more cells. These beams may be configured to maintain a predetermined co-polar isolation (e.g., carrier-to-interference ratio) value in order to minimize the interference among beams. This is called spatial isolation and spatial reuse. In one typical parlance, each spot beam may be assigned a color to create a color pattern that matches a frequency reuse pattern. Identical frequencies, then, may be reused by different beams with the same color.

The phased-array antenna systems of satellite and other communication systems often suppress interference by employing adaptive beamforming techniques. Traditionally, these adaptive phased-array antenna systems utilize a receiver in each of its antenna feed elements, signal correlators, and a central processor to dynamically mitigate interference. Fully-adaptive algorithms employed in these systems, such as the Howells-Applebaum algorithm, typically maximize signal-to-noise ratio (SNR) or minimize received antenna power to achieve performance gains. In many adaptive phased-array antenna systems, the signals at each antenna feed element must be determined accurately to effectively place nulls at sources of interference (sometimes referred to as interference sources, interferers or the like). This drives a requirement for one receiver per antenna feed element and an extensive calibration system, which dramatically impact cost and feasibility for most applications requiring large phased arrays.

An alternative to the aforementioned fully-adaptive arrays utilizes an iterative process that relies on using a constellation pattern of only a subset of the antenna feed elements with imposed weight constraints. These weight-constrained iterative algorithms eliminate the need for element receivers as in fully-adaptive algorithms. But performance of these systems is limited by the low quantity of antenna feed elements that form the cancellation pattern, especially in scenarios where interferers are situated in close proximity to desired signals.

BRIEF SUMMARY

Example implementations of the present disclosure are generally directed to a system and an associated method of suppressing interference in a phased-array antenna system, such as on a communication satellite of a satellite communication system. The system and method of example implementations combine the simplicity of weight-constrained iterative algorithms with the performance of fully-adaptive algorithms (e.g., Howells-Applebaum). In some examples, the system and method accomplish this by eliminating the need for element receivers as in fully-adaptive algorithms, as well as the weight constraints of iterative solutions. The system and method may instead utilize up to all of the antenna feed elements in developing a cancellation pattern, and then incorporate spatial constraints based on known locations of user terminals or sources of desired signals. This may yield a reduction in cost and increased performance, which may enable large adaptive phased-array antenna systems to be competitive in commercial markets.

According to one aspect of example implementations of the present disclosure, a phased-array antenna system is provided that includes an array of antenna feed elements, beamformer, channelizer and antenna controller. The beamformer may be configured to form a plurality of spot beams. The array of antenna feed elements may be coupled to the beamformer and configured to produce a radiation pattern to provide the spot beams within which the array of antenna feed elements may be configured to receive a signal in a frequency band, with the signal carrying communication from a terminal at a known geographic location. And the channelizer may be coupled to the beamformer and configured to divide the frequency band into a plurality of frequency subbands, and measure power levels of the signal over respective frequency subbands.

The antenna controller may be coupled to the channelizer and beamformer, and configured to select a frequency subband of the frequency subbands based on the measured power levels indicating that the signal includes an identifiable interference. The antenna controller may also be configured to calculate a set of beam weights based on the measured power level over the selected frequency subband, and based on the known geographic location of the terminal. The beamformer, then, may be configured to form the spot beams based on the calculated set of beam weights to thereby suppress at least some of the identifiable interference from the signal.

In some examples, the antenna controller being configured to calculate the set of beam weights may include being configured to calculate the set of beam weights that result in a reduction in the measured power level over the selected frequency subband, with no more than an allowable degradation in strength of the radiation pattern in a direction of the known geographic location of the terminal.

In some examples, the signal may carry communication from one or more terminals at respective geographic locations that define a known geographic area. In these examples, the antenna controller being configured to calculate the set of beam weights based on the known location of the terminal may include being configured to calculate the set of beam weights based on the known geographic area.

In some examples, the antenna controller being configured to select the frequency subband may include being configured to select one or more of the frequency subbands over which respective, known nominal power levels are at or less than a threshold power level.

In some examples, the antenna controller may be further configured to identify one of the frequency subbands over which a respective measured power level indicates that the signal includes an identifiable interference. In these examples, the antenna controller being configured to select the frequency subband may include being configured to select the frequency subband at or above the identified frequency subband.

In some further examples, the antenna controller being configured to identify one of the frequency subbands may include being configured to compare at least some of the measured power levels to corresponding, known nominal power levels, and identify one of the measured power levels having a difference from a corresponding one of the nominal power levels at or greater than a threshold power level. The identified one of the measured power levels, then, may be over the identified one of the frequency subbands.

In some examples, the antenna controller being configured to calculate the set of beam weights may include being configured to apply a genetic algorithm. This may include the antenna controller being configured to calculate and evaluate respective fitness values for a plurality of candidate sets of beam weights, and select the set of beam weights from the candidate sets of beam weights based on evaluation of the respective fitness values. Here, the respective fitness values may be calculated from a fitness function defined to include variables of the measured power level over the selected frequency subband, and strength of the radiation pattern in a direction of the known geographic location of the terminal.

In some further examples, the antenna controller being configured to apply the genetic algorithm may include being configured to apply the genetic algorithm for a plurality of iterations. In these examples, each of the iterations may include the antenna controller being configured to calculate and evaluate respective fitness values for a current generation of candidate sets of beam weights, with the current generation of candidate sets of beam weights for each but the last of the iterations being received from a previous one of the iterations. Each but the last of the iterations may include the antenna controller being configured to select candidate sets of beam weights from the current generation of candidate sets of beam weights based on evaluation of the respective fitness values. The antenna controller may then be configured to modify one or more beam weights of each of the selected candidate sets of beam weights to generate a current generation of candidate sets of beam weights for a next one of the iterations. And then the last of the iterations may include the antenna controller being configured to select the set of beam weights from the current generation of candidate sets of beam weights based on evaluation of the respective fitness values.

In other aspects of example implementations, a method is provided for suppressing interference from a signal received by a phased-array antenna system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
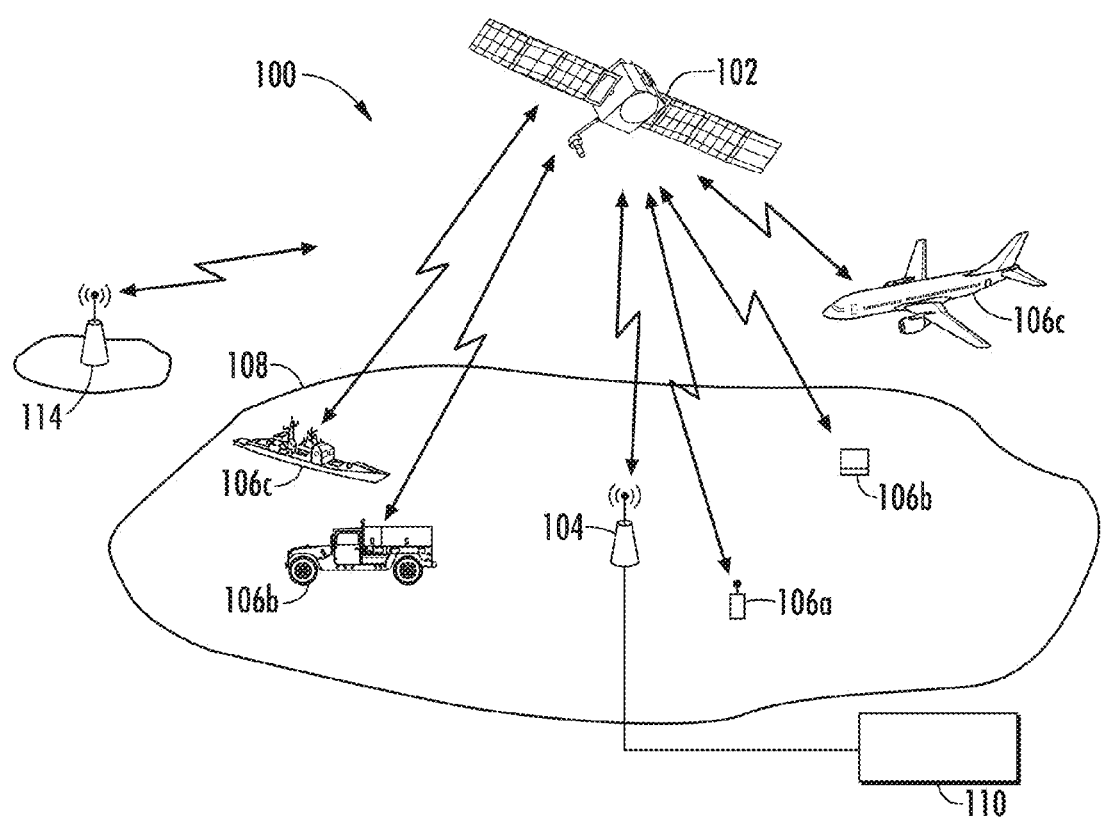
FIG. 1 illustrates a satellite communication system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, reference may be made herein to dimensions of or relationships between components. Those and other similar relationships may be absolute or approximate to account for variations that may occur, such as those due to engineering tolerances or the like. Like reference numerals refer to like elements throughout.

The present disclosure relates to interference suppression in a phased-array antenna system. Example implementations of the present disclosure will be described in the context of a phased-array antenna system in a satellite communication system. But it should be understood that the phased-array antenna system may have a number of applications other than in satellite communication. For example, the phased-array antenna system of example implementations may be used in broadcasting amplitude modulated and frequency modulated signals for various radio stations. As another example, the phased-array antenna system may be used with seagoing vessels, such as to allow a ship to use one radar system for surface detection and tracking, air detection and tracking, and uplink capabilities. In another example, the phased-array antenna system may be used to control an air vehicle during the course of the vehicle's flight. In yet other examples, the phased-array antenna system may be used to provide communication with or between various vehicles, spacecraft or the like, or on a moving vehicle or seagoing vessel to communicate with an aircraft.

FIG. 1 illustrates one example of a satellite communication system 100 in accordance with various example implementations of the present disclosure. As described herein, the term "satellite" may be used without loss of generality and include other types of relay and distribution apparatuses, which in various examples may be located on land or onboard a mobile platform (e.g., land vehicle, aircraft, spacecraft, watercraft). Thus, although the communications system of example implementations may be shown and described as including one or more "satellites," the term may be used more broadly to include one or more relay and distribution apparatuses.

As shown in FIG. 1, the satellite communication system 100 may include one or more satellites 102, one or more satellite ground base stations 104 and a plurality of user terminals 106. The user terminals may be of a variety of different types such as small-sized handheld terminals 106a, mid-sized portable and vehicular terminals 106b, and/or large-sized aeronautical and maritime terminals 106c. The satellite may be configured to communicate with the base station to provide coverage for communication in a geographic region 108 (at times the "coverage region") in which the base station and one or more user terminals may be located. The base station may be coupled to or otherwise part of one or more networks 110, such as the Internet, public switched telephone networks (PSTN), packet data networks (PDN), public land mobile networks (PLMN), private networks such as corporate and government networks, and/or other servers and services.

In various examples, the satellite 102 and base station 104 may enable communication between user terminals 106 and the network 110. In this regard, the base station may receive information (e.g., data) from the network, and communicate the information to the satellite. The satellite may in turn transmit or relay the information to one or more user terminals in spot beams. Conversely, for example, the satellite may receive information from a user terminal, and communicate the information to the base station, which may in turn transmit or relay the information to the network. This type of communication may at times be referred to as "bent-pipe" communication. It should be understood, however, that example implementations may also be applicable to other types of satellite systems, such as those with on-board packet switching.

The satellite 102 of the satellite communication system 100 may employ a number of spot beams providing a beam laydown for the coverage region 108. The beam laydown may be divided into a plurality of cells, and its beams may cover respective cells. Each beam may be assigned some beam indicia to create a pattern that matches a frequency reuse pattern for the satellite. In some examples, the beam indicia may be colors or cells, or may be alpha, numeric or alphanumeric characters. In accordance with example implementations of the present disclosure, the satellite may use same frequency at the same time for two or more cells. That is, the satellite may reuse same frequency in different beams with the same color. In one example, the reuse distance may be measured from the center of one beam to the edge of another beam with the same color.

Figure 2:
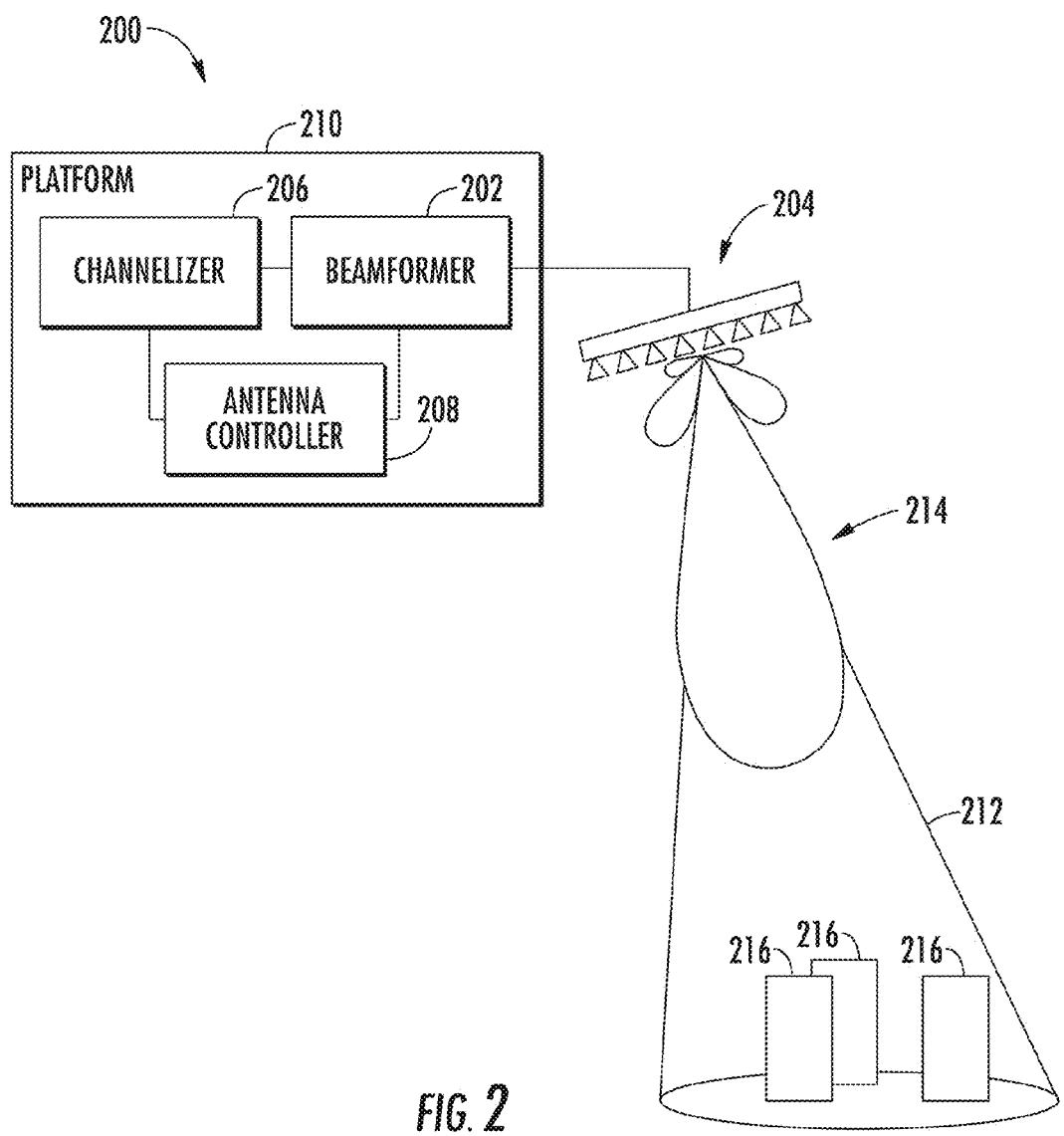
FIG. 2 illustrates a phased-array antenna system, in accordance with one example implementation of the present disclosure.

In various instances, signals received by the satellite in various spot beams may be subjected to interference from a source 114 within or outside the coverage region 108. Example implementations of the present disclosure are generally directed to a system and an associated method of suppressing interference in a phased-array antenna system, such as on the satellite 102 of the satellite communication system 100. FIG. 2 illustrates a phased-array antenna system 200 according to some example implementations, and which in some examples may be carried by the satellite of FIG. 1.

As shown in FIG. 2, the phased-array antenna system 200 of some examples has a number of components including a beamformer 202, an array of antenna feed elements 204, a channelizer 206 and an antenna controller 208. In some examples, the beamformer, channelizer and antenna controller may be onboard a platform 210 configured to carry the array of antenna feed elements.

The beamformer 202 may be configured to form a plurality of spot beams 212. The array of antenna feed elements 204 may be coupled to the beamformer and configured to produce a radiation pattern 214 to provide the spot beams within which the array of antenna feed elements may be configured to receive a signal in a frequency band, with the signal carrying communication from one or more terminals 216 at respective known geographic locations. In some examples, these geographic locations may define a known geographic area, which in the case of a satellite (e.g., 102) may include a coverage region (e.g., coverage region 108) of the satellite.

The channelizer 206 may be coupled to the beamformer and configured to divide the frequency band into a plurality of frequency subbands, and measure power levels of the signal over respective frequency subbands. In some examples, the channelizer may be a digital channelizer having the ability to filter and monitor signals in certain increments (e.g., 2.6 MHz) over a bandwidth (e.g., 500 MHz). The measured power levels over these subbands may facilitate isolation of a source of interference, which may allow suppression of the interference without significantly affecting communication from desired terminal(s) 216.

Figure 3:
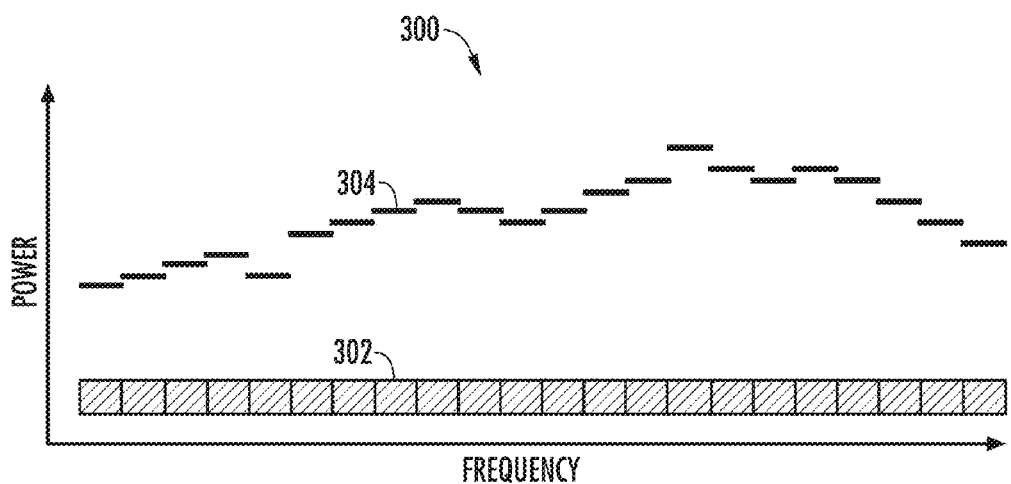
FIGS. 3 and 4 illustrate an example frequency band including a plurality of frequency bands, and a manner by which one or more frequency bands may be selected, according to example implementations of the present disclosure.

FIG. 3 illustrates an example frequency band 300 including a plurality of frequency subbands 302 into which the frequency band may be divided, and including measured power levels 304 of a signal over respective frequency subbands.

Returning to FIG. 2 and with further reference to FIG. 3, the antenna controller 208 may be coupled to the channelizer 206 and beamformer 202, and configured to select one or more frequency subbands 302 based on the measured power levels 304 indicating that the signal includes an identifiable interference. In some examples, the antenna controller may monitor the frequency subbands such as in an increasing order. The antenna controller may identify a frequency subband over which a respective measured power level indicates that the signal includes an identifiable interference, which may be a first of the frequency subbands in in increasing order over which identifiable intereference may be indicated. The antenna controller may then select frequency subband(s) at or above the identified frequency subband.

Figure 4:
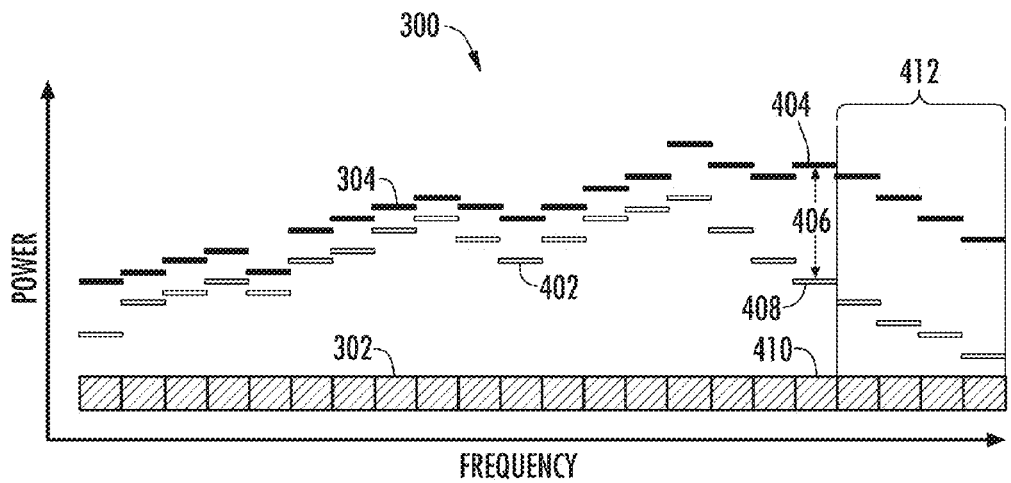

FIG. 4 continues the example of FIG. 3, and illustrates one example by which the antenna controller 208 may select frequency band(s) 302. As shown, the antenna controller may compare at least some of the measured power levels 304 to corresponding, known nominal power levels 402, and identify a measured power level 404 (e.g., a first in increasing order) having a difference 406 from a corresponding nominal power level 408 at or greater than a threshold power level. This may indicate the identified frequency subband 410, and the antenna controller may select frequency subband(s) at or above the identified frequency, those frequency subband(s) being shown in one example as subbands 412. In some examples, these selected frequency subband(s) may be those over which respective, known nominal power levels are at or less than a threshold power level.

Regardless of the exact manner by which the antenna controller 208 selects the frequency subband(s) 302 (e.g., subbands 412), the antenna controller may also be configured to calculate a set of beam weights (or excitation coefficients) based on the measured power level 304 over the selected frequency subband(s). This calculation may also be based on the known geographic location of the terminal 216, or more particularly in some examples, the known geographic area defined by the known location(s) of the terminal(s). In some examples, the set of beam weights may be calculated that result in a reduction in the measured power level over the selected frequency subband, with no more than an allowable degradation in strength of the radiation pattern in a direction of the known geographic location of the terminal, or more particularly in some examples, the direction of the known geographic area. The beamformer 202, then, may be configured to form the spot beams 212 based on the calculated set of beam weights to thereby suppress at least some of the identifiable interference from the signal. In this regard, the beam weights may affect the radiation pattern 214 to effectively place null(s) in direction(s) of the geographic location(s) of source(s) of interference.

The antenna controller 208 may be configured to calculate the set of beam weights in any of a number of different manners. In some examples, the array of antenna feed elements 204 may have amplitude and phase controls that are digital in nature, which may lend itself to a combinatorial technique such as a genetic algorithm. This may include the antenna controller being configured to calculate and evaluate respective fitness (or cost) values for a plurality of candidate sets of beam weights, and select the set of beam weights from the candidate sets of beam weights based on evaluation of the respective fitness values. Here, the respective fitness values may be calculated from a fitness function defined to include variables of the measured power level(s) 304 over the selected frequency subband(s) 302 (e.g., subbands 412), and strength of the radiation pattern 214 in the direction of the known geographic location of the terminal 216, or more particularly in some examples, the direction of the known geographic area.

In some further examples, the antenna controller 208 may apply the genetic algorithm for a plurality of iterations. In these examples, each of the iterations may include the antenna controller calculating and evaluating respective fitness values for a current generation of candidate sets of beam weights, with the current generation of candidate sets of beam weights for each but a last of the iterations being received from a previous one of the iterations. In the first iteration, the current generation may be provided in a number of different manners, such as randomly.

Also for the genetic algorithm, each but the last of the iterations may include the antenna controller 208 being configured to select candidate sets of beam weights from the current generation of candidate sets of beam weights based on evaluation of the respective fitness values. The antenna controller may then to modify (or mutate) one or more beam weights of each of the selected candidate sets of beam weights, such as according to patterns of natural selection to reduce the likelihood of the solution to converge to a local minimum. Modification probabilities may be proportional to the magnitude of a beam weight to avoid unproductive changes in lower-power elements. This may generate a current generation of candidate sets of beam weights for a next one of the iterations. And then the last of the iterations may include the antenna controller being configured to select the set of beam weights from the current generation of candidate sets of beam weights based on evaluation of the respective fitness values. This last iteration may be marked by the selected set of beam weights having fitness value greater than a threshold value.

Figure 5:
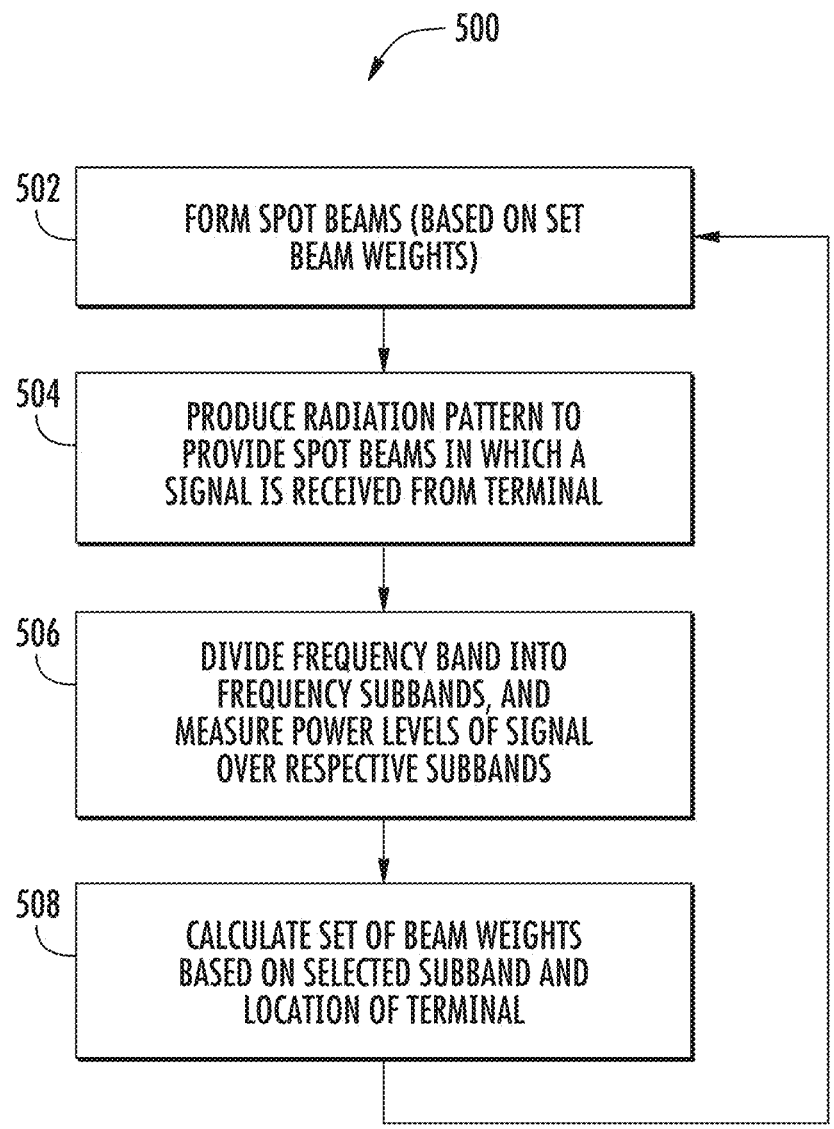
FIG. 5 illustrates a flowchart including various operations in a method according to aspects of example implementations of the present disclosure.

FIG. 5 illustrates a flowchart including various operations in a method 500 of suppressing interference from a signal received by a phased-array antenna system 200, according to aspects of example implementations of the present disclosure. As shown at block 502, the method may include forming a plurality of spot beams 212. The method also includes producing a radiation pattern 214 by an array of antenna feed elements 202 to provide the spot beams within which the array of antenna feed elements receives a signal in a frequency band, with the signal carrying communication from a terminal at a known geographic location, as shown in block 504.

In addition, the method includes dividing the frequency band into a plurality of frequency subbands, and measuring power levels of the signal over respective frequency subbands, as shown at block 506. The method also includes selecting a (one or more) frequency subband of the frequency subbands based on the measured power levels indicating that the signal includes an identifiable interference. And as shown at block 508, the method includes calculating a set of beam weights based on the measured power level over the selected frequency subband, and based on the known geographic location of the terminal. The spot beams, then, may be formed based on the calculated set of beam weights to thereby suppress at least some of the identifiable interference from the signal.

Figure 6A:
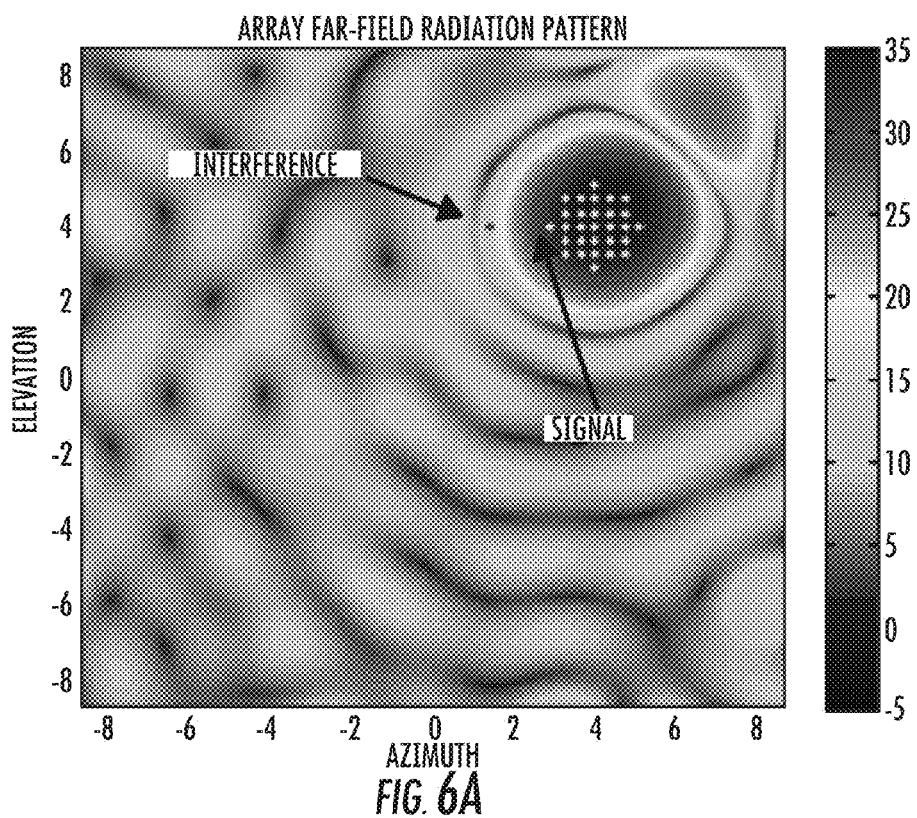
FIGS. 6a and 6b are contour graphs that illustrate performance of some example implementations of the present disclosure.
Figure 6B:
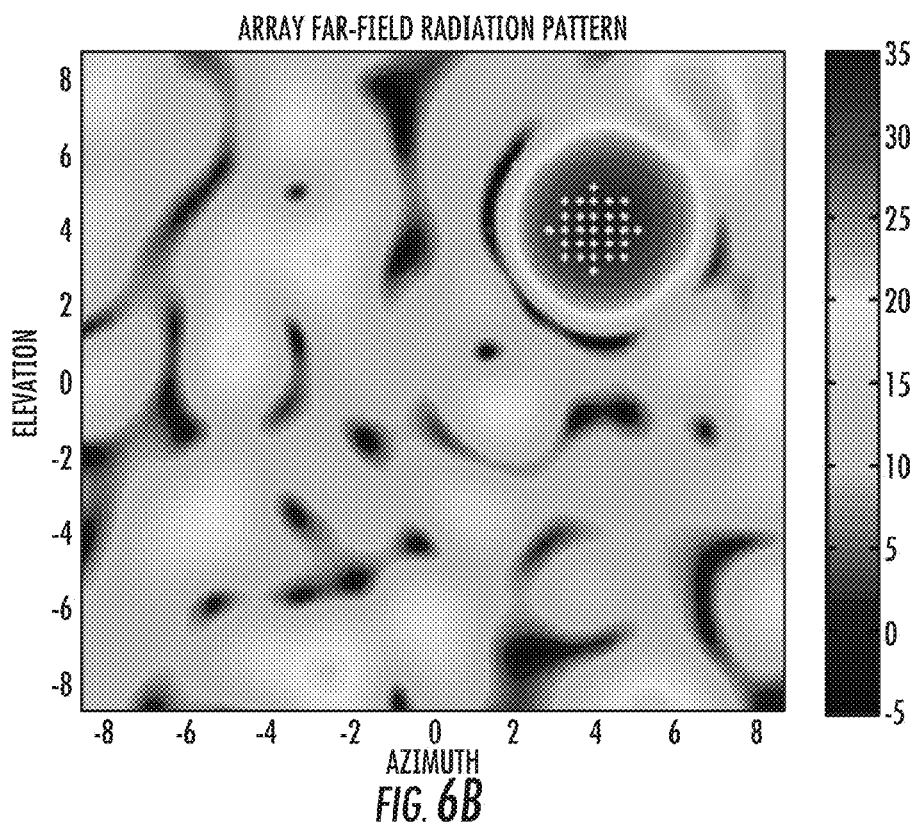

FIGS. 6a and 6b are contour graphs that illustrate performance of some example implementations of the present disclosure. Here, FIG. 6a shows the antenna pattern before nulling, and FIG. 6b shows the pattern after nulling. Null depths of better than 30 dB may be achieved according to example implementations of the present disclosure.

Figure 7:
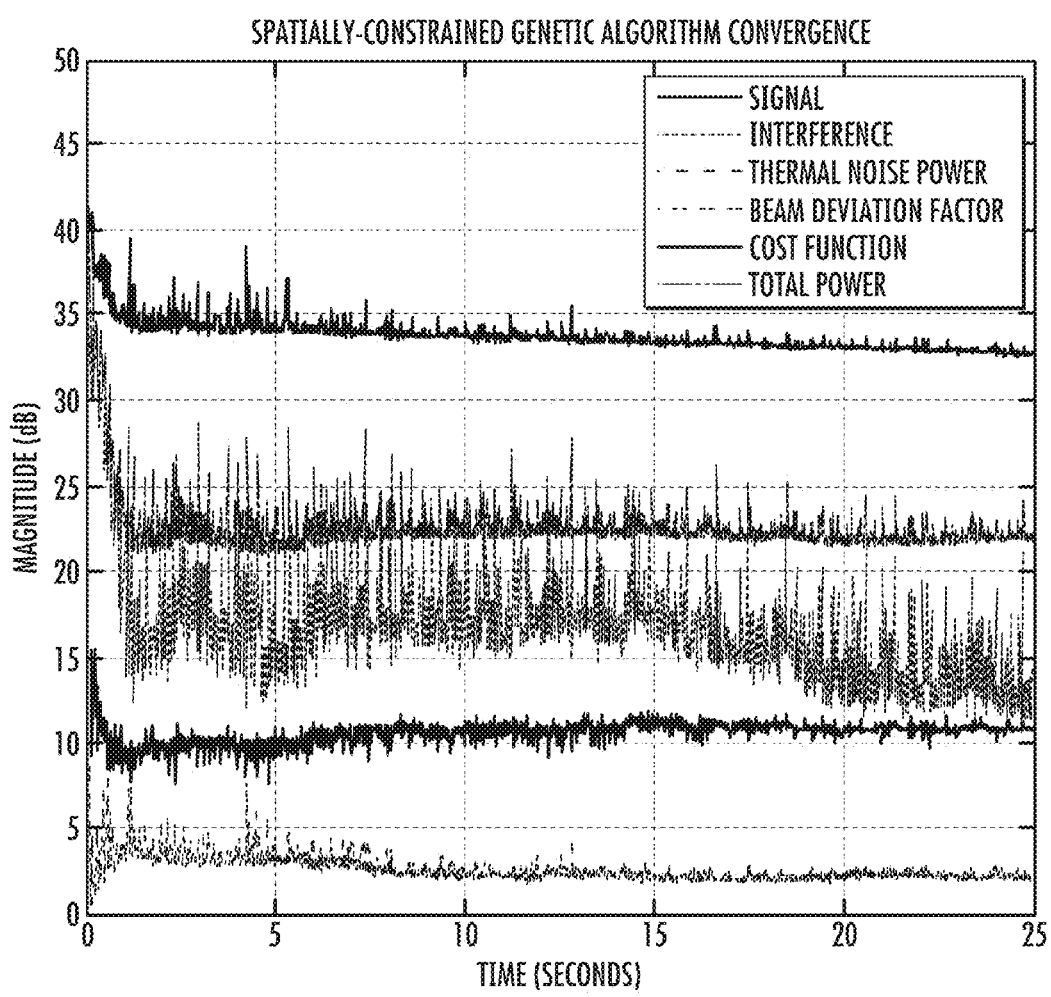
FIG. 7 is a line graph illustrating power levels of various parameters during the course of implementing example implementations of the present disclosure.

The genetic algorithm of some examples may use the universal interface capability (A-Bus), which may allow rapid iteration and evolution of the null pattern, decreasing response time and increasing robustness of the system to rapidly varying sources of interference. FIG. 7 is a line graph illustrating power levels of various parameters during the course of implementing example implementations of the present disclosure. In some examples, a convergence time of 2-4 seconds may be achieved.

Figure 8A:
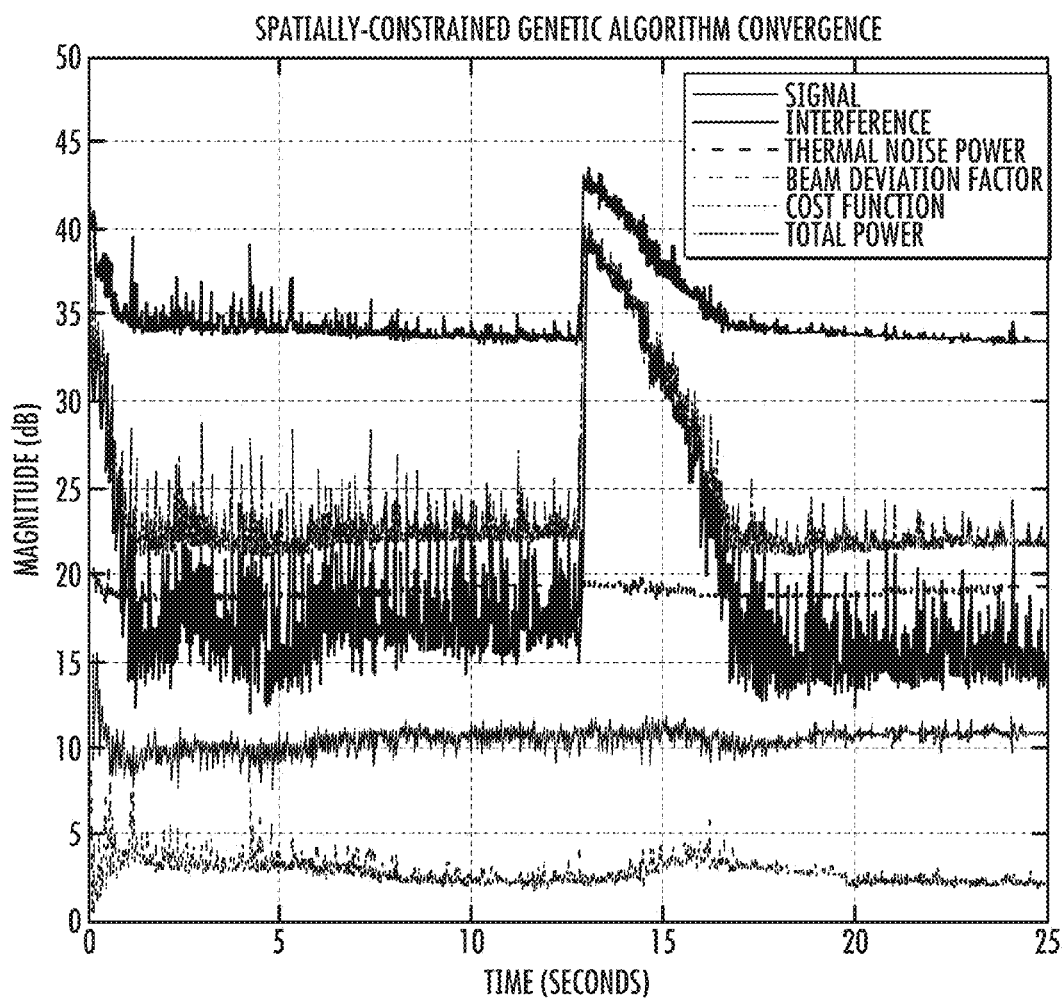
FIGS. 8a, 8b and 8c illustrate contour graph and line graphs demonstrating the dynamic behavior of example implementations of the present disclosure in the event of changes in the location of a source of interference.
Figure 8B:
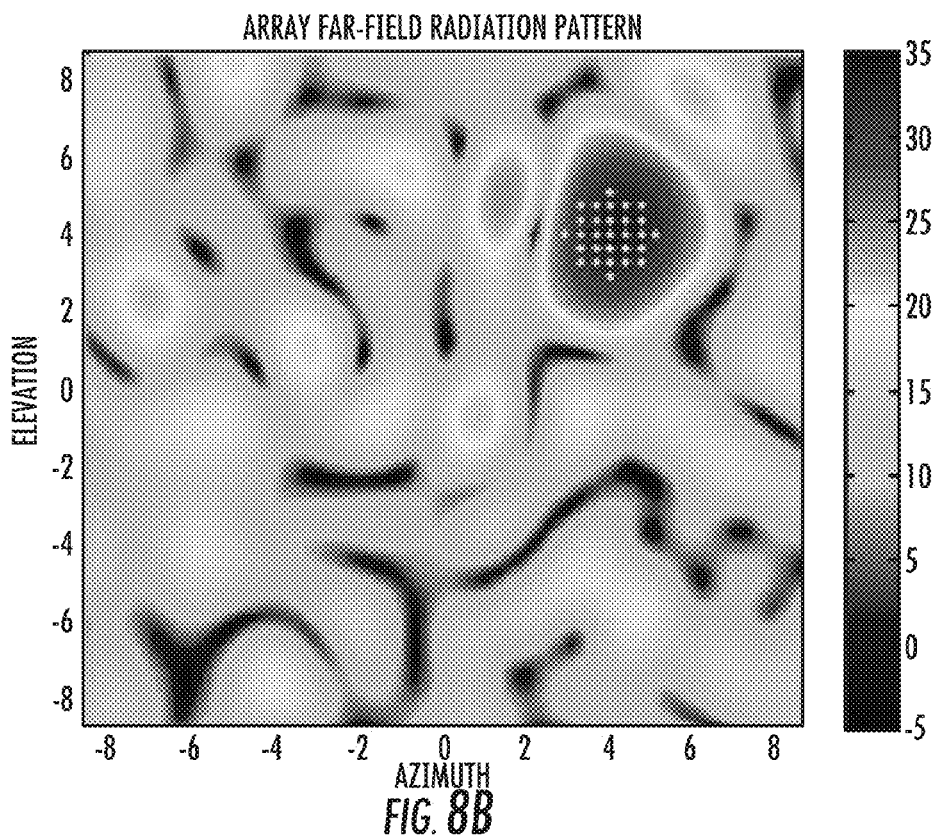
Figure 8C:
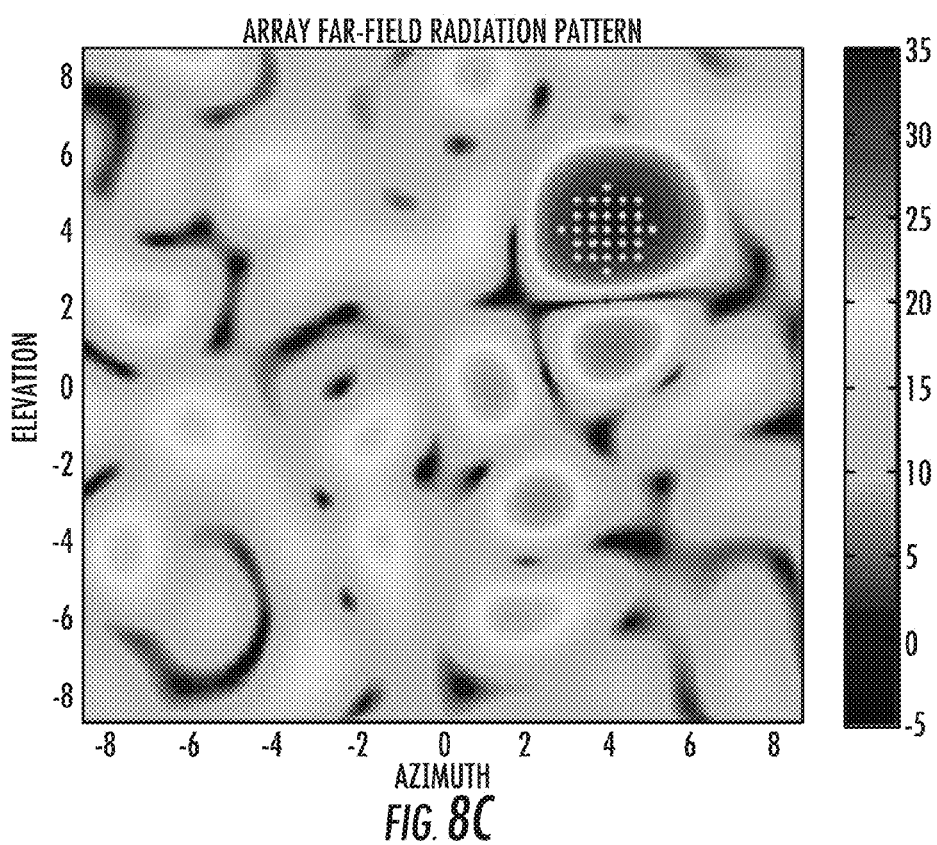

FIGS. 8a, 8b and 8c illustrate contour graph and line graphs demonstrating the dynamic behavior of example implementations of the present disclosure in the event of changes in the location of a source of interference. FIG. 8a shows the power levels as a function of time, where the change in the location of a source of interference at 13 seconds may cause a temporary increase in the interference power, which may be subsequently suppressed within a convergence time of the algorithm (e.g., 2-4 seconds). FIGS. 8b and 8c show the radiation patterns for the two locations where null location moves to the new interference position.

Figure 9A:
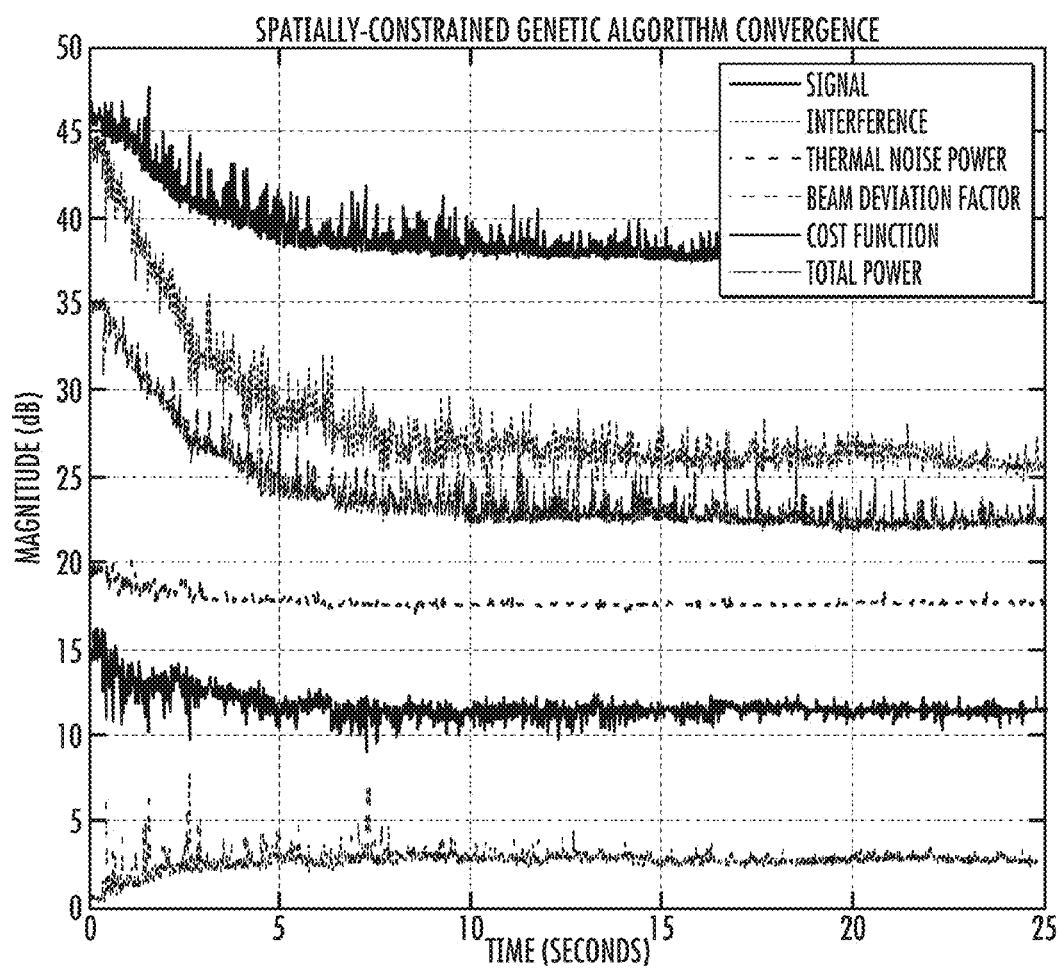
FIGS. 9a and 9b illustrate a line graph and contour graph that demonstrate the behavior of example implementations in the event of multiple sources of interference.
Figure 9B:
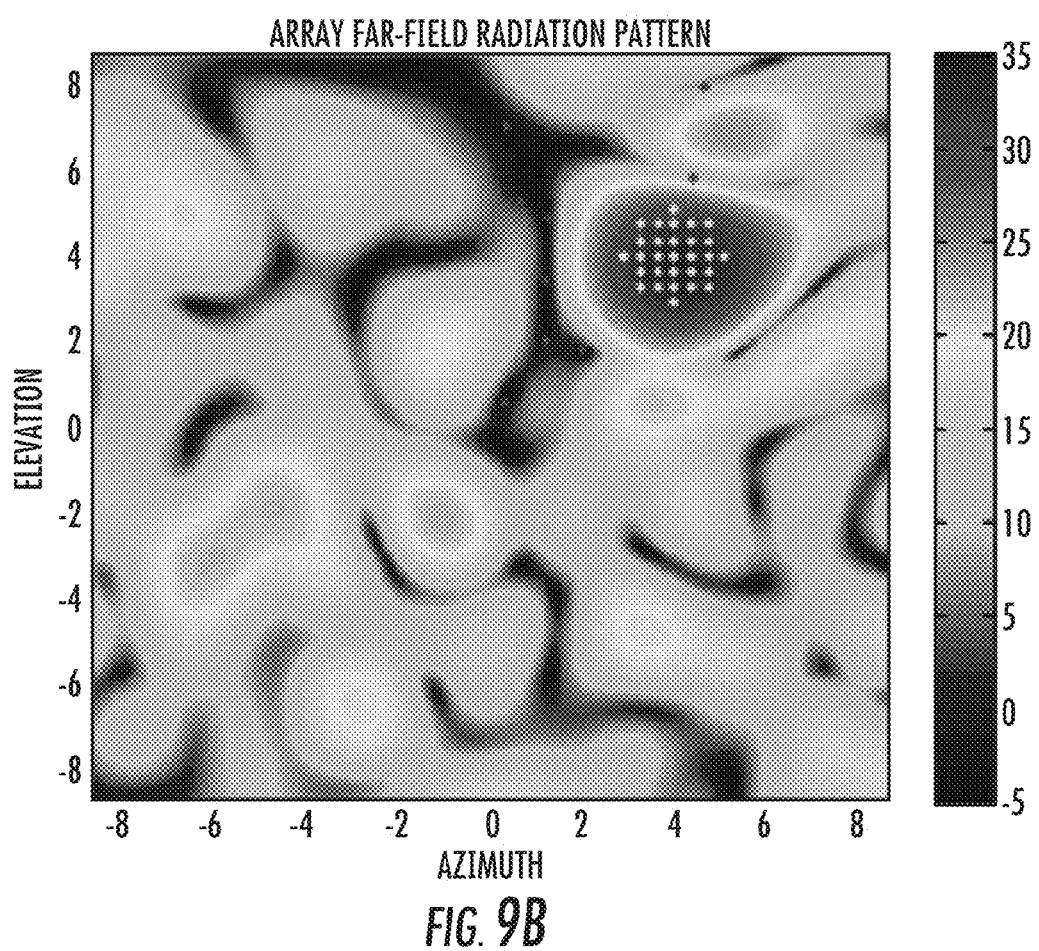

FIGS. 9a and 9b illustrate a line graph and contour graph that demonstrate the behavior of example implementations in the event of multiple sources of interference. As shown, example implementations may achieve multiple nulls while maintaining performance over the desired terminals.

According to example implementations of the present disclosure, the phased-array antenna system 200 and its components including the beamformer 202, array of antenna feed elements 204, channelizer 206 and antenna controller 208 may be implemented by various means. These means may include hardware, alone or under direction of one or more computer program code instructions, program instructions or executable computer-readable program code instructions from a computer-readable storage medium.

In one example, an apparatus may be provided that is configured to function as or otherwise implement the antenna controller 208 shown and described herein. Generally, the apparatus may comprise, include or be embodied in one or more fixed or portable, hardware-based electronic devices and include one or more of each of a number of components such as, for example, a processor connected to a memory.

The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which this disclosure pertains having the benefit of the teachings presented in the foregoing description and the associated drawings. In the context of the phased-array antenna system used on a satellite, for example, various metrics may be transmitted to a ground base station and on to a satellite operations center for enhanced processing, which may allow the system to adapt to new jamming strategies as they emerge. Additionally or alternatively, for example, configuration of the phased-array antenna system may be set via an encrypted command link or spacecraft control processor. The channelizer may also provide reconfigurable advanced signal processing functions that may enhance response of the system to sources of interference, such as through variable response-time ALC, hard limiters, reconfigurable fixed-gain control or the like.

It should therefore be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A phased-array antenna system comprising:
a beamformer configured to form a plurality of spot beams;
an array of antenna feed elements coupled to the beamformer and configured to produce a radiation pattern to provide the spot beams within which the array of antenna feed elements is configured to receive a signal in a frequency band, the signal carrying communication from a terminal at a known geographic location;
a channelizer coupled to the beamformer and configured to divide the frequency band into a plurality of frequency subbands, and measure power levels of the signal over respective frequency subbands; and
an antenna controller coupled to the channelizer and beamformer, the antenna controller being configured to:
select a frequency subband of the frequency subbands based on the measured power levels indicating that the signal includes an identifiable interference; and
calculate a set of beam weights based on the measured power level over the selected frequency subband, and based on the known geographic location of the terminal,
wherein the beamformer being configured to form the spot beams includes being configured to form the spot beams based on the calculated set of beam weights to thereby suppress at least some of the identifiable interference from the signal.

2. The phased-array antenna system of claim 1, wherein the antenna controller being configured to calculate the set of beam weights includes being configured to calculate the set of beam weights that result in a reduction in the measured power level over the selected frequency subband, with no more than an allowable degradation in strength of the radiation pattern in a direction of the known geographic location of the terminal.

3. The phased-array antenna system of claim 1, wherein the signal carries communication from one or more terminals at respective geographic locations that define a known geographic area, and
wherein the antenna controller being configured to calculate the set of beam weights based on the known location of the terminal includes being configured to calculate the set of beam weights based on the known geographic area.

4. The phased-array antenna system of claim 1, wherein the antenna controller being configured to select the frequency subband includes being configured to select one or more of the frequency subbands over which respective, known nominal power levels are at or less than a threshold power level.

5. The phased-array antenna system of claim 1, wherein the antenna controller is further configured to identify one of the frequency subbands over which a respective measured power level indicates that the signal includes an identifiable interference, and
wherein the antenna controller being configured to select the frequency subband includes being configured to select the frequency subband at or above the identified frequency subband.

6. The phased-array antenna system of claim 5, wherein the antenna controller being configured to identify one of the frequency subbands includes being configured to:
compare at least some of the measured power levels to corresponding, known nominal power levels; and
identify one of the measured power levels having a difference from a corresponding one of the nominal power levels at or greater than a threshold power level, the identified one of the measured power levels being over the identified one of the frequency subbands.

7. The phased-array antenna system of claim 1, wherein the antenna controller being configured to calculate the set of beam weights includes being configured to apply a genetic algorithm including being configured to:
calculate and evaluate respective fitness values for a plurality of candidate sets of beam weights, the respective fitness values being calculated from a fitness function defined to include variables of the measured power level over the selected frequency subband, and strength of the radiation pattern in a direction of the known geographic location of the terminal; and
select the set of beam weights from the candidate sets of beam weights based on evaluation of the respective fitness values.

8. The phased-array antenna system of claim 7, wherein the antenna controller being configured to apply the genetic algorithm includes being configured to apply the genetic algorithm for a plurality of iterations,
wherein each of the iterations includes the antenna controller being configured to calculate and evaluate respective fitness values for a current generation of candidate sets of beam weights, the current generation of candidate sets of beam weights for each but a last of the iterations being received from a previous one of the iterations,
wherein each but the last of the iterations includes the antenna controller being configured to select candidate sets of beam weights from the current generation of candidate sets of beam weights based on evaluation of the respective fitness values, and modify one or more beam weights of each of the selected candidate sets of beam weights to generate a current generation of candidate sets of beam weights for a next one of the iterations, and
wherein the last of the iterations includes the antenna controller being configured to select the set of beam weights from the current generation of candidate sets of beam weights based on evaluation of the respective fitness values.

9. A method comprising:
forming a plurality of spot beams;
producing a radiation pattern by an array of antenna feed elements to provide the spot beams within which the array of antenna feed elements receives a signal in a frequency band, the signal carrying communication from a terminal at a known geographic location;
forming the spot beams provided by the radiation pattern produced by the array of antenna feed elements;
dividing the frequency band into a plurality of frequency subbands, and measuring power levels of the signal over respective frequency subbands;
selecting a frequency subband of the frequency subbands based on the measured power levels indicating that the signal includes an identifiable interference; and
calculating a set of beam weights based on the measured power level over the selected frequency subband, and based on the known geographic location of the terminal,
wherein forming the spot beams includes forming the spot beams based on the calculated set of beam weights to thereby suppress at least some of the identifiable interference from the signal.

10. The method of claim 9, wherein calculating the set of beam weights includes calculating the set of beam weights that result in a reduction in the measured power level over the selected frequency subband, with no more than an allowable degradation in strength of the radiation pattern in a direction of the known geographic location of the terminal.

11. The method of claim 9, wherein the signal carries communication from one or more terminals at respective geographic locations that define a known geographic area, and
wherein calculating the set of beam weights based on the known location of the terminal includes calculating the set of beam weights based on the known geographic area.

12. The method of claim 9, wherein selecting the frequency subband includes selecting one or more of the frequency subbands over which respective, known nominal power levels are at or less than a threshold power level.

13. The method of claim 9 further comprising identifying one of the frequency subbands over which a respective measured power level indicates that the signal includes an identifiable interference,
wherein selecting the frequency subband includes selecting the frequency subband at or above the identified frequency subband.

14. The method of claim 13, wherein identifying one of the frequency subbands comprises:
comparing at least some of the measured power levels to corresponding, known nominal power levels; and
identifying one of the measured power levels having a difference from a corresponding one of the nominal power levels at or greater than a threshold power level, the identified one of the measured power levels being over the identified one of the frequency subbands.

15. The method of claim 9, wherein calculating the set of beam weights comprises applying a genetic algorithm including:
calculating and evaluating respective fitness values for a plurality of candidate sets of beam weights, the respective fitness values being calculated from a fitness function defined to include variables of the measured power level over the selected frequency subband, and strength of the radiation pattern in a direction of the known geographic location of the terminal; and
selecting the set of beam weights from the candidate sets of beam weights based on evaluation of the respective fitness values.

16. The method of claim 15, wherein applying the genetic algorithm includes applying the genetic algorithm for a plurality of iterations,
wherein each of the iterations includes calculating and evaluating respective fitness values for a current generation of candidate sets of beam weights, the current generation of candidate sets of beam weights for each but a last of the iterations being received from a previous one of the iterations,
wherein each but the last of the iterations includes selecting candidate sets of beam weights from the current generation of candidate sets of beam weights based on evaluation of the respective fitness values, and modifying one or more beam weights of each of the selected candidate sets of beam weights to generate a current generation of candidate sets of beam weights for a next one of the iterations, and
wherein the last of the iterations includes selecting the set of beam weights from the current generation of candidate sets of beam weights based on evaluation of the respective fitness values.

\* \* \* \* \*